United States Patent

Thévenaz

[11] 3,922,077
[45] Nov. 25, 1975

[54] CINEMATOGRAPHIC PROJECTOR

[75] Inventor: Jean A. Thévenaz, Grandson, Switzerland

[73] Assignee: Bolex International SA, Ste. Croix, Switzerland

[22] Filed: Mar. 25, 1974

[21] Appl. No.: 454,299

Related U.S. Application Data

[63] Continuation-in-part of Ser. No. 293,150, Sept. 28, 1972.

[30] Foreign Application Priority Data

Sept. 27, 1971 Switzerland............................ 14147

[52] U.S. Cl................................. 352/202; 352/211
[51] Int. Cl.²........................................... G03B 9/10
[58] Field of Search .......... 352/211, 212, 213, 208, 352/198, 202, 203; 355/70

[56] References Cited
UNITED STATES PATENTS

| | | |
|---|---|---|
| 2,082,093 | 6/1937 | Bedford .............................. 352/208 |
| 2,461,140 | 2/1949 | Capstaff............................. 352/211 |
| 2,525,598 | 10/1950 | Gruber.............................. 352/198 X |
| 3,428,397 | 2/1969 | Elmer ............................... 355/70 X |
| 3,697,177 | 10/1972 | Booth ............................... 355/70 X |

Primary Examiner—Monroe H. Hayes

[57] ABSTRACT

A cinematographic projector in which means are provided to establish the light and heat intensity gradient on the frame such that the highest intensity is at the frame outer-portions and the lowest intensity is at the frame central portion. One form of projector includes a specially designed shutter and another form includes a reflective surface with a non-reflecting portion in its central region.

1 Claim, 7 Drawing Figures

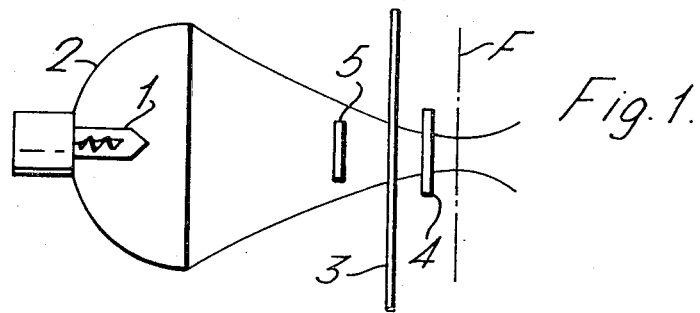
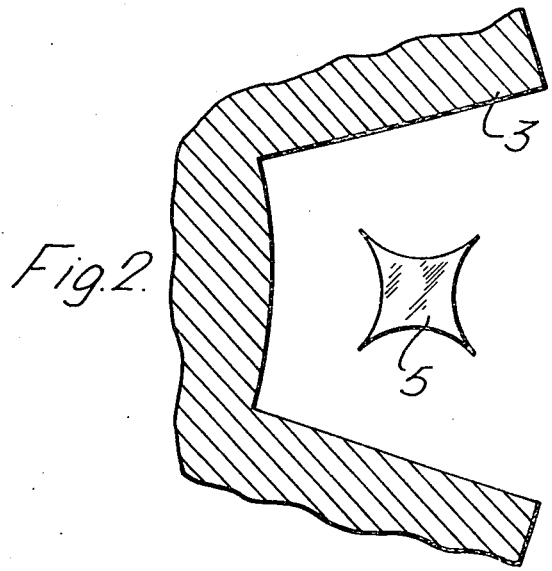
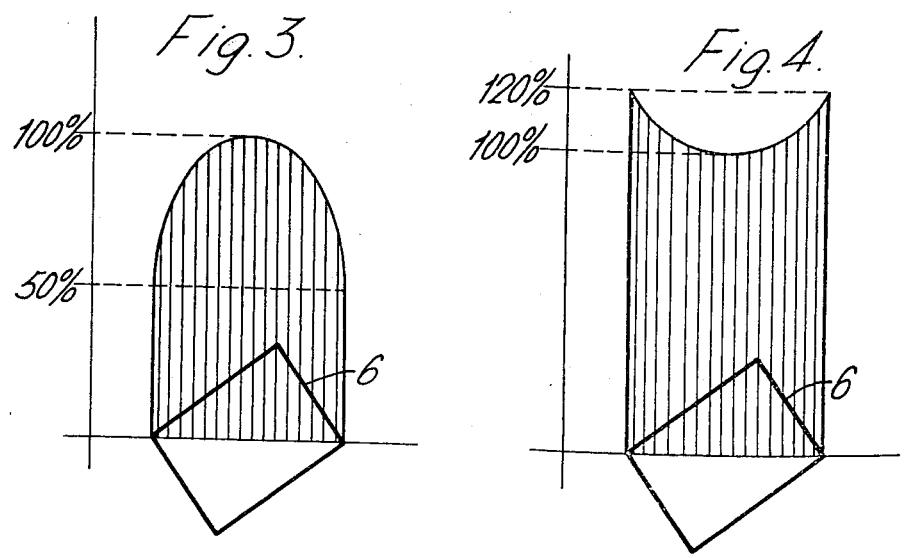

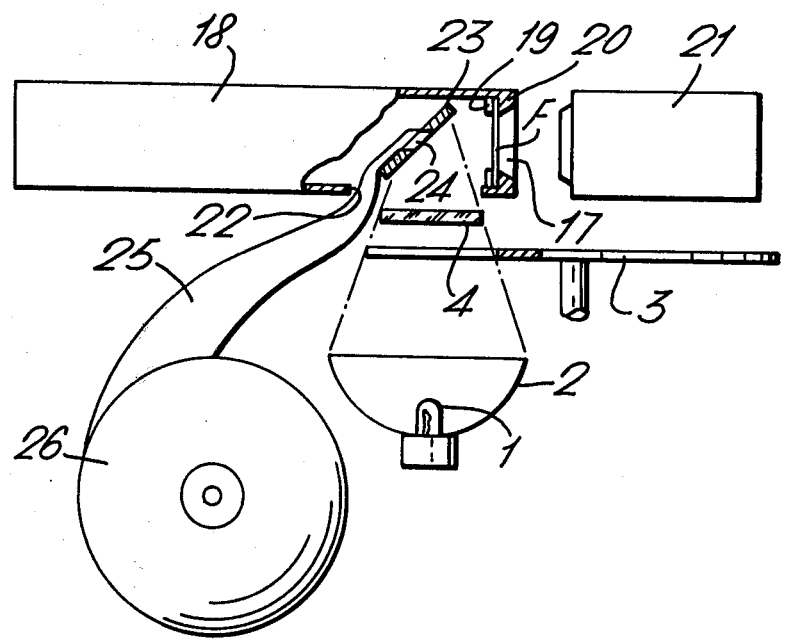

CINEMATOGRAPHIC PROJECTOR

RELATED APPLICATIONS

This application is a continuation in part of the co-pending application entitled Cinematographic Projector by Jean Thevenaz, Ser. No. 293,150, filed Sept. 28, 1972, having the same assignee as the present application.

FIELD OF INVENTION

This invention relates to cinematographic projectors and more particularly to such projectors in which means are provided to prevent damage to the film frame by light or heat radiation.

BACKGROUND

Projectors adapted to show narrow films such as the "super 8," which are designed to project one frame for a prolonged length of time, are usually equipped with devices that protect the film from heat damage during projection. For example, when the picture is viewed through a diffusing screen in an undarkened room, the intensity of light concentrated onto the film is such that a deterioration of the film occurs, first in the center of the image and then spreading to the edges. Dichroic reflecting projection lamps are often used to reduce this effect. The light beam projected onto the film is further filtered either by an absorbing filter, or by an interferential filter, or perhaps by an additional absorbing glass screen with interferential layers coating its surface.

These conventional methods of transparency projection in an undarkened room are not free of technical problems since they affect light emanation to a point where only a very small picture can be projected to be seen satisfactorily. Therefore, it is neither possible to obtain the same luminosity during normal speed projection as during "still" projection, nor to get the same luminosity pattern on the film frame when different elements are put on the path of the light beam during normal projection and "still" projection. Furthermore, the known apparatus (see U.S. Pat. No. 1,812,212) include auxiliary shutters controlled to move out of the light path during normal projection and swing into the path during single frame projection. Auxiliary shutters complicate and enlarge the projector mechanism. Also, these shutters cannot be actioned fast enough to intercept the light where film advance is controlled by impulses registered on magnetic tape or other storage media.

A principal object of this invention is to obtain a larger and more luminous picture without damaging the film and to avoid the disadvantages and technical problems stated above by providing the same elements to intercept the path of the light beam during still projection and during normal speed projection. During still projection the rotative shutter continues to rotate at a predetermined speed to avoid flickering on the projection screen.

SUMMARY OF INVENTION

The projector according to the invention therefore comprises a source of light, means of moving a film forward intermittently in front of a film gate, an objective having at least one element in the light path between said source of light and the film for the interception of the beam of light emitted by said source of light, and formed in such a way that it removes a greater proportion of the light rays directed towards the center of the film gate than those directed towards non-central zones of the said film gate during normal film projection and during slow or single frame film projection.

One embodiment of the invention provides the projector shutter with edges of the light blocking and transmitting zones shaped such that during movement of the shutter across the rays the interruption of light transmitted to the central region of the film frame is longer than that light transmitted to the center regions of the film gate.

Another embodiment of the invention includes a mirror positioned to reflect light toward the film gate adapted to reflect a greater intensity to the outer regions than to the inner regions of the film gate. The mirror center region can be opaque or open and a blower can cooperate to direct cooling air through the opening onto the film gate.

DRAWINGS

Other and further objects and features of the invention shall become apparent with the following detailed description of exemplary embodiments when taken in view of the appended drawings in which:

FIG. 1 shows a diagramatic representation of a lighting device of a cinematographic film according to the invention.

FIG. 2 shows an enlarged cut-away side elevation of the shutter and screen of FIG. 1.

FIG. 3 shows the light intensity distribution on a film frame in a conventional projector.

FIG. 4 shows the same information as in FIG. 3 for a projector according to the invention.

FIG. 7 shows another embodiment of the invention.

Figure 5:
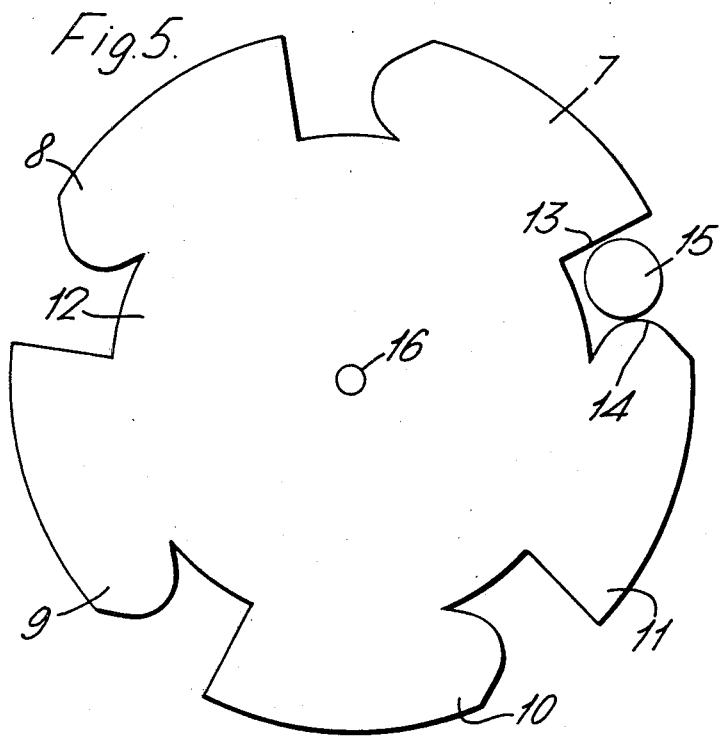
FIG. 5 shows a shutter of a cinematographic projector according to another embodiment of the invention.
Figure 6:
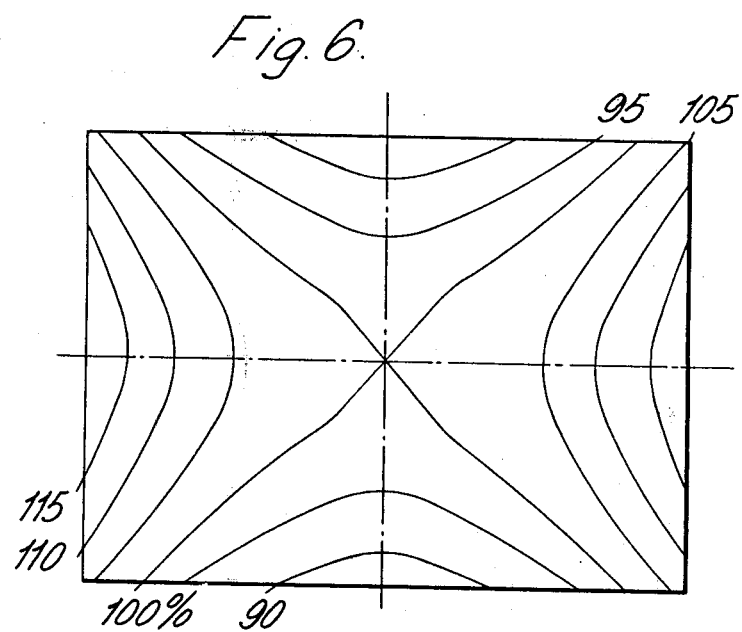
FIG. 6 shows the luminosity distribution on the surface of a frame in a projector provided with the shutter of FIG. 3.

With reference to FIG. 1, a lamp 1, i.e. halogen lamp, produces a beam of light which illuminates a frame of a film F. The rays are reflected toward film F by a dichroic mirror 2, i.e. a mirror which reflects a large proportion of the rays from the visible spectrum and a small proportion of infra-red heat rays. The projector includes a conventional shutter 3 and an interferential filter 4, as well as standard means (not shown) of advancing the film intermittently in front of the film gate. An objection, not shown in the diagram, intercepts the image in front of the film gate and directs an enlarged image onto a screen.

According to this embodiment of the invention, a star-shaped screen 5 generally as illustrated in FIG. 2 is positioned in the path of the light rays between the lamp 1 and the film F. This screen 5 is opaque and intercepts part of the light beam directed towards the center of the film gate. Screen 5 may be of any suitable reflective or absorbent metallic material such as aluminum, brass, etc. and may be glued or otherwise supported on a transparent glass sheet or may be fixed by a support provided with the prolongation (not shown) of one of the points of the star-shaped screen 2. Since projector objectives transmit a quantity of light which is 30% to 50% more intense in the center than at the edges, when the objectives project an image viewed by transparency on a translucent screen, the difference in luminosity between the center and the edges of the image is particularly noticeable. The luminosity in the center of the projected image is predetermined by the intensity of light and heat which can be applied to the center of the film without danger of damage. Therefore, according to this invention, the total luminosity of the projected image is significantly improved by increasing the intensity of light on the film progressively in an inverse relation to the decrease of light from the center to the edge of the objective.

By using this inverse relation, it is possible to obtain an excellent image whose edges are 10% to 40% brighter than the center.

It should be noted that the screen 5 is placed in such a way that it intercepts the light rays which come directly from the lamp 1, i.e. in which the proportion of infra-red rays has not been decreased with respect to the proportion of visible light rays by reflection from a dichroic mirror.

FIG. 3 shows the distribution of light on a diagonal of the image projected onto a screen in a projector without screen 5. The frame of this image is represented diagrammatically by the rectangle 6. This figure shows clearly that the maximum intensity of light is at the center of the image and that it decreases rapidly towards the edges of the image.

FIG. 4 is similar to FIG. 3 but shows the case of a projector fitted with screen 5, this screen being shaped in such a way that the edges of the image are more luminous than the center. It can be seen that the total amount of light is much greater than in FIG. 3 even though the central part of the image is equally bright in both figures. The total luminosity in the two cases is approximately proportional to the integral of the luminosity along the diagonal which is represented in FIGS. 3 and 4 by the vertically hatched surfaces.

The increase in the total luminosity is obtained by means of a more powerful source of light and the central luminosity being maintained at its acceptable maximum by means of an adequate filter.

FIG. 5 shows a rotating projector shutter configured according to the invention to reduce the luminosity integral at the frame center relative to the edges. The shutter rotates during normal, slow and single frame projection at a predetermined speed or speeds selected to avoid noticeable flickering. In this example the blades 7 to 11 of the shutter 12 each have one straight side 13 and one curved side 14. In this manner, the interception of the central part of the beam, indicated diagrammatically by the circle 15, lasts longer than the interception of the two outer parts of the beam which are situated respectively nearest and farthest from the axle 16 of the shutter 12.

In this manner a decrease in the luminosity can be obtained from the two edges towards the center, while the light tends to decrease further from the center towards the two other edges. However, this slight decrease in brightness towards the top and bottom of the image is generally not perceived by the viewer.

FIG. 7 shows another embodiment, in which the projector functions with film cassettes such as cassette 18 shown in the projection position. This cassette 18 presents a channel formed by pressure guides 19 and a pressure plate 20 in which the projection window 17 is located. The latter is opposite an objective lens 21.

The cassette 18 presents an opening 22 through which a mirror 23 is introduced and positioned in line with window 17. This mirror 23 reflects the rays from a source of light (the lamp 1 and the reflector 2) onto the film F in front of the projection aperture 17. The projector also comprises a shutter 3 and an interferential filter 4.

An opening or hole 24 is provided in the mirror 23. An air pump located within the projector communiates through an air-duct 25 with opening 24. In operation, the pump forces air through duct 25, out opening 24 and onto part of the film which is in front of the projection opening 17. Thus an effective cooling of the film is achieved during projection. Furthermore, hole 24, being non-reflecting, functions to decrease the quantity of heat and light rays directed towards the central part of the image. This decrease may be such that the intensity in the center of the image is betwen 40% and 90% of the intensity along the edges of the images.

A variation of the arrangement of FIG. 7 may omit the air cooling capability and provide mirror 23 without opening 24. In this case a portion of the surface of the mirror has a lower reflecting power than the remaining surface thereof. Preferably the lower reflecting portion should be generally star-shaped and centrally oriented, as the screen 5 represented in FIG. 2.

Numerous variations could, of course, be envisaged and in the case of the rotative shutter as in FIG. 5, both effective edges of the blade could be curved. Similarly, the shape and position of the screen 5 in the cases shown in FIGS. 1 and 2 can be greatly modified.

Other and further modifications may be made to the examples of the embodiments disclosed herein without departing from the spirit and scope of the present invention.

What is claimed is:

1. A cinematographic projector having a light source, means for advancing the cinematographic film in front of the film gate and a lens to diffuse the light and infra-red rays from said light source in an irregular pattern so that the intensity of these rays in the central region of each film frame would be stronger than that on the outer regions thereof, said projector further comprising control means arranged to intercept the central light and infra-red rays during film advance type projection and still projection for changing said irregular intensity pattern in such a manner that the maximum of intensity is displaced from the central region of each film frame to the outer regions thereof, and wherein said control means comprises a mirror positioned to reflect the light and infra-red rays from the source towards the film gate, said mirror reflecting surface having an opening in its central region to reflect a greater intensity of light and infra-red rays at its outer regions than at its central region, and said projector further comprising means for forcing air through said mirror opening directly on to the central region of the film frame.

* * * * *